(12) United States Patent
Ferreira et al.

(10) Patent No.: US 12,530,619 B2
(45) Date of Patent: Jan. 20, 2026

(54) FEATURE-AWARE OPEN SET MULTI-MODEL FOR TRAJECTORY CLASSIFICATION IN MOBILE EDGE DEVICES

(71) Applicant: Dell Products L.P., Round Rock, TX (US)

(72) Inventors: Paulo Abelha Ferreira, Rio de Janeiro (BR); Vinicius Michel Gottin, Rio de Janeiro (BR); Pablo Nascimento da Silva, Niteroi (BR)

(73) Assignee: Dell Products L.P., Round Rock, TX (US)

( * ) Notice: Subject to any disclaimer, the term of this patent is extended or adjusted under 35 U.S.C. 154(b) by 718 days.

(21) Appl. No.: 17/812,605

(22) Filed: Jul. 14, 2022

(65) Prior Publication Data

US 2024/0020571 A1    Jan. 18, 2024

(51) Int. Cl.
*G06N 20/00* (2019.01)
(52) U.S. Cl.
CPC .................... *G06N 20/00* (2019.01)
(58) Field of Classification Search
CPC ........................................ G06N 20/00
See application file for complete search history.

(56) References Cited

U.S. PATENT DOCUMENTS

| | | | |
|---|---|---|---|
| 6,393,362 B1 | 5/2002 | Burns | |
| 8,169,335 B2 | 5/2012 | Frederick et al. | |
| 9,547,969 B2 | 1/2017 | Beggs et al. | |
| 9,576,480 B1 | 2/2017 | Shoshan | |
| 9,671,777 B1 * | 6/2017 | Aichele | B25J 9/1666 |
| 9,674,498 B1 | 6/2017 | Mukherjee et al. | |
| 9,764,472 B1 | 9/2017 | Ebrahimi et al. | |
| 10,525,882 B2 | 1/2020 | Bernstein et al. | |
| 10,661,795 B1 | 5/2020 | Li et al. | |

(Continued)

FOREIGN PATENT DOCUMENTS

| | | |
|---|---|---|
| CN | 106651884 B | 10/2019 |
| CN | 112613586 A | 4/2021 |

(Continued)

OTHER PUBLICATIONS

U.S. Appl. No. 17/663,423, titled, "Unsupervised Learning For Real-Time Detection of Far Edge Mobile Device Trajectories", filed May 14, 2022.

(Continued)

*Primary Examiner* — Eliyah S. Harper
(74) *Attorney, Agent, or Firm* — Workman Nydegger (57) ABSTRACT

One example method includes training an event predictor, of a machine learning model, wherein the training includes training an event predictor of the machine learning model, and training open set trajectory classifier, of the machine learning model. After the event predictor is trained, the event predictor is operable to receive an unknown trajectory class and predict an event class for the unknown trajectory class. Further, after the open set trajectory classifier is trained, the open set trajectory classifier is operable to receive an unknown trajectory and classify the unknown trajectory with a predicted trajectory classification. Finally, during training, the output of the open-set trajectory classifier may be used as an input to the event predictor.

18 Claims, 6 Drawing Sheets

(56) References Cited

U.S. PATENT DOCUMENTS

| | | |
|---|---|---|
| 10,885,775 B2 | 1/2021 | Herson et al. |
| 11,086,328 B2 | 8/2021 | Keivan et al. |
| 11,165,954 B1 | 11/2021 | Beach et al. |
| 11,232,294 B1 | 1/2022 | Banerjee et al. |
| 11,577,741 B1 | 2/2023 | Reschka et al. |
| 12,012,318 B2 | 6/2024 | Gottin et al. |
| 12,093,815 B2* | 9/2024 | Otsuki .............. G06N 3/08 |
| 12,094,451 B1 | 9/2024 | Zhang et al. |
| 2009/0109049 A1 | 4/2009 | Frederick et al. |
| 2010/0208064 A1 | 8/2010 | Liu et al. |
| 2010/0228427 A1 | 9/2010 | Anderson et al. |
| 2011/0010023 A1 | 1/2011 | Kunzig et al. |
| 2011/0093134 A1 | 4/2011 | Emanuel et al. |
| 2011/0279261 A1 | 11/2011 | Gauger et al. |
| 2012/0025964 A1 | 2/2012 | Beggs et al. |
| 2012/0083947 A1 | 4/2012 | Anderson et al. |
| 2014/0191869 A1 | 7/2014 | Frederick |
| 2014/0324336 A1 | 10/2014 | Prokhorov et al. |
| 2015/0145661 A1 | 5/2015 | Beggs et al. |
| 2016/0129592 A1 | 5/2016 | Saboo et al. |
| 2016/0180713 A1 | 6/2016 | Bernhardt et al. |
| 2017/0297569 A1 | 10/2017 | Nilsson et al. |
| 2017/0337813 A1* | 11/2017 | Taylor .............. G05D 1/0285 |
| 2017/0337820 A1 | 11/2017 | Glatfelter et al. |
| 2017/0356596 A1 | 12/2017 | Frederick |
| 2018/0203727 A1 | 7/2018 | Jarvis et al. |
| 2019/0043351 A1 | 2/2019 | Yang et al. |
| 2019/0138895 A1 | 5/2019 | Jin et al. |
| 2019/0179329 A1 | 6/2019 | Keivan et al. |
| 2019/0268722 A1 | 8/2019 | Elswick et al. |
| 2019/0317219 A1* | 10/2019 | Smith .............. B60W 40/04 |
| 2020/0225673 A1 | 7/2020 | Ebrahimi et al. |
| 2020/0257310 A1 | 8/2020 | Du et al. |
| 2020/0311559 A1 | 10/2020 | Chattopadhyay et al. |
| 2020/0334837 A1 | 10/2020 | Feigl et al. |
| 2020/0380406 A1 | 12/2020 | Dickens et al. |
| 2020/0410281 A1* | 12/2020 | Goel .............. G06N 3/084 |
| 2021/0089762 A1* | 3/2021 | Rahimi .............. G06V 40/10 |
| 2021/0192810 A1* | 6/2021 | Paysan .............. G06T 7/0012 |
| 2021/0273858 A1 | 9/2021 | Radovanovic et al. |
| 2021/0295154 A1* | 9/2021 | Groh .............. G06N 3/045 |
| 2022/0066456 A1 | 3/2022 | Ebrahimi et al. |
| 2022/0089372 A1 | 3/2022 | Phillips et al. |
| 2022/0138943 A1* | 5/2022 | Zhu .............. G01R 33/561 382/131 |
| 2022/0231919 A1 | 7/2022 | Pandey et al. |
| 2022/0253647 A1 | 8/2022 | Perkins |
| 2022/0330896 A1 | 10/2022 | Min et al. |
| 2022/0394531 A1 | 12/2022 | Jeong et al. |
| 2022/0409991 A1 | 12/2022 | Ohashi et al. |
| 2023/0030039 A1 | 2/2023 | Drapeko et al. |
| 2023/0068523 A1* | 3/2023 | Santra .............. G01S 7/417 |
| 2023/0159027 A1 | 5/2023 | Pronovost |
| 2023/0177951 A1* | 6/2023 | Mubarek .............. G01C 21/3822 701/117 |
| 2023/0221942 A1 | 7/2023 | Zhang et al. |
| 2023/0305564 A1 | 9/2023 | Gottin et al. |
| 2023/0368129 A1 | 11/2023 | Gottin et al. |
| 2023/0409881 A1* | 12/2023 | Heitzmann .............. B60T 8/174 |
| 2024/0003235 A1 | 1/2024 | Bruns et al. |
| 2024/0020571 A1* | 1/2024 | Ferreira .............. G06N 20/00 |
| 2024/0190473 A1* | 6/2024 | Akella .............. B60W 30/0956 |
| 2024/0214314 A1 | 6/2024 | Zhao et al. |
| 2024/0278797 A1 | 8/2024 | Agrawal et al. |
| 2024/0311731 A1 | 9/2024 | Caron et al. |
| 2025/0077942 A1* | 3/2025 | Chaabane .............. G06V 20/588 |

FOREIGN PATENT DOCUMENTS

| | | |
|---|---|---|
| CN | 112945227 A | 6/2021 |
| CN | 114460537 A | 5/2022 |
| CN | 114527676 A | 5/2022 |
| DE | 102021200452 A1 | 7/2022 |
| WO | 2011/092229 A1 | 8/2011 |
| WO | 2022/156947 A1 | 7/2022 |
| WO | 2023/287176 A1 | 1/2023 |

OTHER PUBLICATIONS

U.S. Appl. No. 17/585,055, titled, Edge-Enabled Trajectory Map Generation, filed Jan. 26, 2022.

Oza, P., & Patel, V. M. (2019). "C2ae: Class Conditioned Auto-Encoder for Open-set Recognition." In Proceedings of the IEEE/CVF Conference on Computer Vision and Pattern Recognition (pp. 2307-2316).

"How Accurate Are RFID Systems?"—RFID Journal; (Accessed Oct. 28, 2022).

B. Kim, C. Kang, J. Kim, S. Lee, C. Chung and J. Choi, "Probabilistic vehicle trajectory prediction over occupancy grid map via recurrent neural network," in 20th International Conference on Intelligent Transportation Systems (ITSC), 2017.

C. Hegde, S. Dash and P. Agarwal, "Vehicle Trajectory Prediction using GAN," in Fourth International Conference on I-SMAC (IoT in Social, Mobile, Analytics and Cloud)(I-SMAC) , 2020.

Gal, Yarin, and Zoubin Ghahramani. "Dropout as a Bayesian approximation: Representing model uncertainty in deep learning." international conference on machine learning. PMLR, 2016.

Inpixon—Bluetooth Location Tracking & Positioning, https://www.inpixon.com/technology/standards/bluetooth-low-energy (Accessed Oct. 28, 2022).

Link Labs—"The Complete Active RFID Overview", Mar. 14, 2018.

S. Srikanth, J. Ansari, R. Ram, S. Sharma, J. Murthy and K. Krishna, "Infer: Intermediate representations for future prediction," in IEEE/RSJ International Conference on Intelligent Robots and Systems (IROS) , 2019.

Wikipedia, Autoencoder, https://en.wikipedia.org/wiki/Autoencoder, Jan. 10, 2021.

B. Alexe, T. Deselaers and V. Ferrari, "Measuring the objectness of image windows," IEEE transactions on pattern analysis and machine intelligence, vol. 11, No. 34, pp. 2189-2202, 2021.

B. McMahan, E. Moore, D. Ramage, S. Hampson and B. y Arcas, "Communication-efficient learning of deep networks from decentralized data.," In Artificial Intelligence and Statistics, pp. 1273-1282, 2017.

C. L. Zitnick and p. Dollár, "Edge boxes: Locating object proposals from edges.," European conference on computer vision, pp. 391-405, 2014.

J. Bernstein, Y. X. Wang, K. Azizzadenesheli and A. Anandkumar, "signSGD: compressed optimisation for non-convex problems," CoRR, vol. abs/1802.04434, 2021.

K. M. Rashid and A. H. Behzadan, "Risk Behavior-Based Trajectory Prediction for Construction Site Safety Monitoring," Journal of construction engineering and management, 2018.

Li, "Federated learning: Challenges, methods, and future directions," IEEE Signal Processing Magazine, vol. 37, No. 3. pp. 50-60, 2020.

P. Tang, X. Wang, A. Wang, Y. Yan, W. Liu, J. Huang and A. Yuille, "Weakly supervised region proposal network and object detection," Proceedings of the European conference on computer vision (ECCV), 2018.

He, Chaoyang, et al. "Federated Learning for Internet of Things" IEEE Internet of Things Magazine 5.1 (2021): 24-29. (Year: 2021).

Liu et al., "T-C3D: Temporal Convolutional 3D Network for Real-Time Action Recognition" AAAI, 2018, (Year: 2018).

W.-H. Chung, G. Chakraborty, R.-C. Chen and C. Bornand, "Object Dynamics from Video Clips using YOLO Framework," 2019 IEEE 10th International Conference on Awareness Science and Technology (iCAST), Morioka, Japan, Oct. 23-25, 2019, pp. 1-6, (Year: 2019).

Mirus et al., "Detection of abnormal driving situations using distributed representations and unsupervised learning", Oct. 2020, European Symposium on Artificial Neural Networks, Computational Intelligence and Machine Learning, pp. 363-368 (Year: 2020).

(56) References Cited

OTHER PUBLICATIONS

Shekhar, "What Are L1 and L2 Loss Functions?", Aug. 1, 2019, Outcome School, p. 1-4 (Year: 2019).

* cited by examiner

FEATURE-AWARE OPEN SET MULTI-MODEL FOR TRAJECTORY CLASSIFICATION IN MOBILE EDGE DEVICES

RELATED APPLICATIONS

This application is related to United States Patent Applications: (1) Ser. No. 17/585,055, entitled EDGE-ENABLED TRAJECTORY MAP GENERATION, filed 26 Jan. 2022; (2) Ser. No. 17/663,423, entitled UNSUPERVISED LEARNING FOR REAL-TIME DETECTION OF EVENTS OF FAR EDGE MOBILE DEVICE TRAJECTORIES, filed 14 May 2022; and (3) Ser. No. 17/585,055, entitled EDGE-ENABLED TRAJECTORY MAP GENERATION, filed 26 Jan. 2022. All of the aforementioned applications are incorporated herein in their respective entireties by this reference.

FIELD OF THE INVENTION

Embodiments of the present invention generally relate to artificial intelligence and machine learning. More particularly, at least some embodiments of the invention relate to systems, hardware, software, computer-readable media, and methods, for machine learning techniques dealing with open sets.

BACKGROUND

There is an ongoing need for solutions to the rising AI/ML (artificial intelligence/machine learning) and infrastructure needs of the edge. A promising edge space to work on is smart services for mobile edge devices, for instance, in the logistic space of warehouse management and safety, where there may be multiple mobile devices, such as forklift trucks for example, requiring decisions in real time.

The data collected from these mobile device trajectories, that is, the travel paths and other operations of the mobile devices, may be leveraged into ML models to optimize operation, or to address dangerous circumstances, such as by way of object/event detection approaches. The idea is to provide smart services to improve the autonomy of these mobile edge devices and add value to customers.

When performing event detection from trajectories, classifying typical trajectories can be important. To illustrate, if the current trajectory of a forklift resembles a typical trajectory that is known to lead to dangerous cornering, for example the current trajectory contains a point, in a map of a warehouse, that is related to a high frequency of dangerous cornering events, the system can raise an alarm and/or decrease the thresholds for accelerometer data collection.

While models have been developed for classifying typical trajectories, and are capable of detecting dangerous events, such models assume that the set of typical trajectories remains static. In real world environments however, it cannot be expected that this will be the case. That is, in new environments or contexts, a mobile edge device might produce an unknown trajectory that can lead to poor model performance and, correspondingly, problematic actions by the mobile edge device resulting from the poor performance of the model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to artificial intelligence and machine learning. More particularly, at least some embodiments of the invention relate to systems, hardware, software, computer-readable media, and methods, for machine learning techniques dealing with open sets. For example, some embodiments may be focused on dealing with event detection models whose inputs are trajectories, along with possibly additional features as inputs, and such embodiments may comprise an event detection model configured to deal with unknown trajectories that may appear as part of the operation of a mobile edge device.

More particularly, some example embodiments are directed to the creation and use of ML models, or simply 'models,' that may be able to effectively deal with an open set scenario in trajectory classification for mobile edge devices. By enabling classification of the trajectory at hand, particularly if the trajectory is new, some embodiments may thereby improve model performance. Example embodiments may require minimum human intervention and, as such, may be inexpensively and flexibly adapted to mobile edge device operations in dynamic domains where new and/or modified device trajectories may be introduced, possibly without any prior notice to the device or ML model.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an example embodiment of the invention may be directed to a model that is able to effectively deal with open set scenarios in which new circumstances occur for which the model has not been trained, so that the model is able to readily adapt to changing conditions involving the operation of a mobile edge device that may be partly, or completely, autonomous in its operation. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for Some Example Embodiments

A.1 Multiple Model Scenarios

Example embodiments may be implemented in contexts involving multiple different models, each having a different classification/regression goal, and one example of which is detecting dangerous cornering events involving a mobile edge device such as a motorized vehicle of some type. As used herein, a trajectory may comprise a 2D topological object, but it might contain different features associated with each of its points or physical locations, where such features might include, for example, velocity, acceleration, position, and/or other sensor data acquired at those points or locations. Each model may have its own set of features related to the trajectory. For instance, one of these models could be directed towards classifying dangerous cornering events that might occur during the operation of mobile edge devices—in this case, the trajectory object might contain acceleration information for each of the 3 axes of motion, in addition to position data for the trajectory.

To deal with multiple models in an edge computing and operating environment, it may be necessary to have proper routing of training, and validation, datasets constructed to form the correct features for the models. Therefore, a protocol/framework for routing this information may correspondingly need an efficient and correct dataset assignment to edge nodes and their required model(s).

A.2 Open Set Classification

Supervised learning methods may have the underlying strong assumption of complete knowledge of the mappings from raw data to classes. In more technical terms, this means that these models do have an assumption of a mutually exclusive, collectively exhaustive (MECE), mapping from the feature domain to the finite set of classes that the model was trained on. While this assumption might be correct for some kinds of tasks, such as, for instance, predicting the real number of a drawn digit or classifying an image in a set of finite classes, in the real world it is almost never the case that the available annotated/training data for a given ML task contains all the possible classes of the domain.

However, relaxing the assumption of MECE mapping from feature to classes generates challenges. One such challenge is how to create an ML model that is capable of distinguishing between the classes of data/information in its domain that are known to it, and one or more classes of data/information in its operating domain that are unknown to the ML model. This kind of task is not naturally tackled by any of the conventional ML models such as Random Forests, Support Vector Machines (SVM) or Deep Neural Networks (DNNs). For example, DNNs used for classification commonly apply a Softmax activation in the end, which means that every single observation of the feature space will be mapped to one of its known classes.

B. Example Components for Some Embodiments

Example embodiments may comprise, and/or employ, various components. These include, for example, auto-encoders, auto-classifiers, and a class-conditioned autoencoder for open sets. Examples of each of these are discussed below.

B.1 Auto-Encoders

Auto-encoders, or simply 'encoders,' comprise deep neural networks (DNN) that learn to compress, and decompress, high-dimensional data. In more detail, an autoencoder is a type of artificial neural network that may be used to learn efficient codings of unlabeled data (unsupervised learning). The encoding is validated and refined by attempting to regenerate the input from the encoding. The autoencoder learns a representation (encoding) for a set of data, typically, but not necessarily, for dimensionality reduction, by training the network to ignore insignificant data ("noise"). See en.wikipedia.org/wiki/Autoencoder. Graphically rendered, an auto-encoder may take the form of an hourglass-shaped network of dimensionality-reducing encoder layers, and dimensionality-increasing decoder layers. The DNN, or auto-encoder, may operate to find non-linear patterns that decrease (encode) the data, and then increase (decode) the dimensionality of the data to reconstruct, if imperfectly, the original data.

Figure 1:
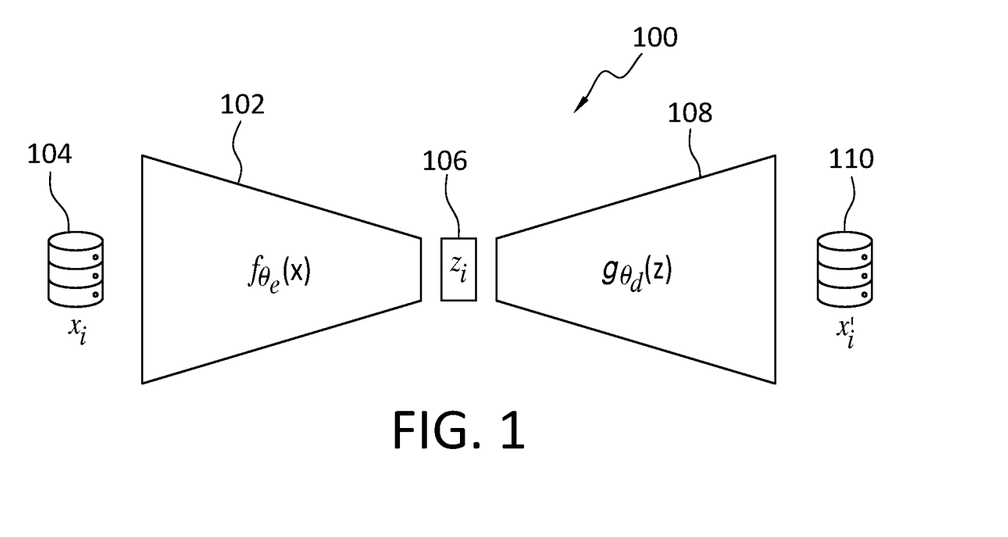
FIG. 1 discloses aspects of an auto-encoder.

With reference to the example of FIG. 1, an auto-encoder 100 can learn by themselves how to compress a set of data using only information obtained by the auto-encoder from the data itself. This type of learning may be referred to as 'unsupervised.' The layers of an encoder 102, which may comprise a compression function, when used in isolation, may generate a result in the form of compressed data Z. Therefore, each datum Xi 104 that passes through the encoder 102 will lead to a latent vector Zi 106 which may comprise a representation of the data that was compressed and which, when passed through a decoder 108, will be transformed into a decompressed datum Xi' 110.

The compression performance of a model that includes an auto-encoder may serve as an indication as to how well that model can be expected to perform during, and after, training. Note that auto-encoders typically experience some amount of reconstruction error, that is, the decoded data is not exactly the same as the data that was initially encoded. The relative amount of reconstruction error may provide a useful indicator as to the level of performance provided by the auto-encoder. In some cases, the reconstruction error may be back-propagated to the encoder 102 in order to help refine the performance of the encoder 102.

B.2 Auto-Classifiers

Figure 2:
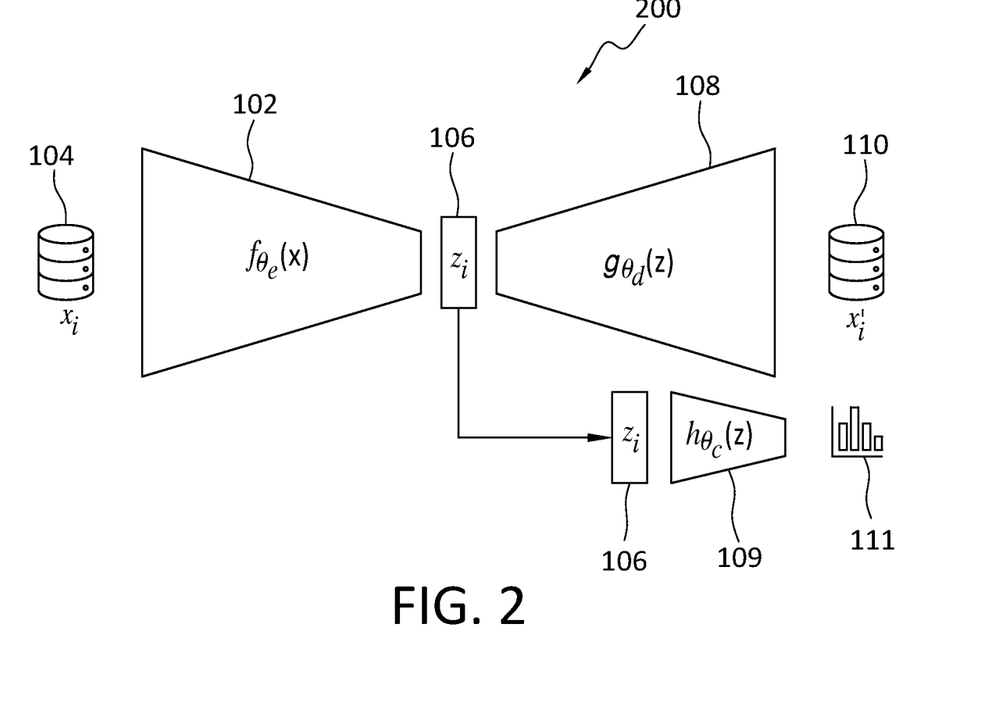
FIG. 2 discloses aspects of an auto-classifier.

An auto-classifier, such as the auto-classifier 200 disclosed in FIG. 2 for example, comprises a modification of an auto-encoder, such as the auto-encoder 100 for example, and, as such, includes an extra neural network, $h\theta c(z)$ 109, that takes in a latent vector Zi 108 and predicts a distribution 111 of data over a set of defined class labels. The auto-classifier 200 may comprise a dual learning objective: compressing the data into a latent space and predicting a distribution over class labels. Note that as the foregoing suggests, a set of class labels may be needed during the training of the ML model so that the training data, such as known trajectories for example, can be classified using those labels.

B.3 Class-Conditioned Autoencoder for Open Set

In a conventional supervised-learning setting, the aim is to train a classifier that deals only with known classes in what is sometimes referred to as a 'closed-set' world. That is, the set is considered to be 'closed' insofar as it has been defined, and implemented, to include only known classes and/or data.

By way of contrast, 'open set' scenarios may provide a more realistic, and more challenging, setting since there may be one or more classes and/or data present that were not available to the model at training time. In such scenarios, the model may be required to respond, effectively, to the new scenarios. Open set models may be extensions of the SVM (Support Vector Machine) canonical formulation, where sophisticated statistical models are used to enclose/bound the dual spaces created by the SVM, which would otherwise be unbounded.

One example of a state-of-the-art approach is the C2AE (Class-conditioned Auto Encoder), examples of which include a modified auto-classifier and are disclosed in Oza, P., & Patel, V. M. (2019). *C2ae: Class conditioned autoencoder for open-set recognition. In Proceedings of the IEEE/CVF Conference on Computer Vision and Pattern Recognition* (pp. 2307-2316) ("Oza") which is incorporated herein in its entirety by this reference.

The C2AE training may comprise two primary stages: (1) closed-set training in which the C2AE is trained as a conventional auto-classifier; and (2) open-set training. Open-set training may involve various elements, and these may comprise:

a. conditional decoder training—train the auto-classifier to perform a good reconstruction of the label of its input, but to perform a bad reconstruction when conditioned on other labels (doing this for all labels but the input label);

b. EVT modeling (Extreme Value Theory) may be used to model the tail of a distribution with a Generalized Pareto Distribution (GPD)—then, a threshold can be found from which to define what are the extreme values of the original distribution;

c. threshold calculation—find the threshold in the intersection of the reconstruction error histograms for matching and non-matching classes using the EVT modeling referred to above.

It is noted that C2AE also has its own, different, open-set test stage (k-inference). That is, at test time, it may operate to test the input against all known classes as conditioning vectors. Then, the minimum reconstruction error may be tested against the calculated threshold during training of a model. If this minimum is less than the threshold, it may be output as the predicted class, otherwise, it may be output/predicted as an unknown class.

C. Aspects of Some Example Embodiments

Example embodiments of the invention may implement an open-set approach to the problem of classifying unknown trajectories in the logistics domain. The guiding example domain, which is note intended to limit the scope of the invention in any way, for embodiments of the invention will be a setting where a customer has multiple facilities, each with multiple deployed mobile devices at the edge, and each of those edge-deployed mobile devices having multiple ML models used for decision-making and operation of the mobile devices. These models may leverage, at least, positioning data such as may be obtained by a GPS (global positioning system) or other system, but may employ other sets of features as well. Positioning data, and other features, may be constantly computed and updated.

Figure 3:
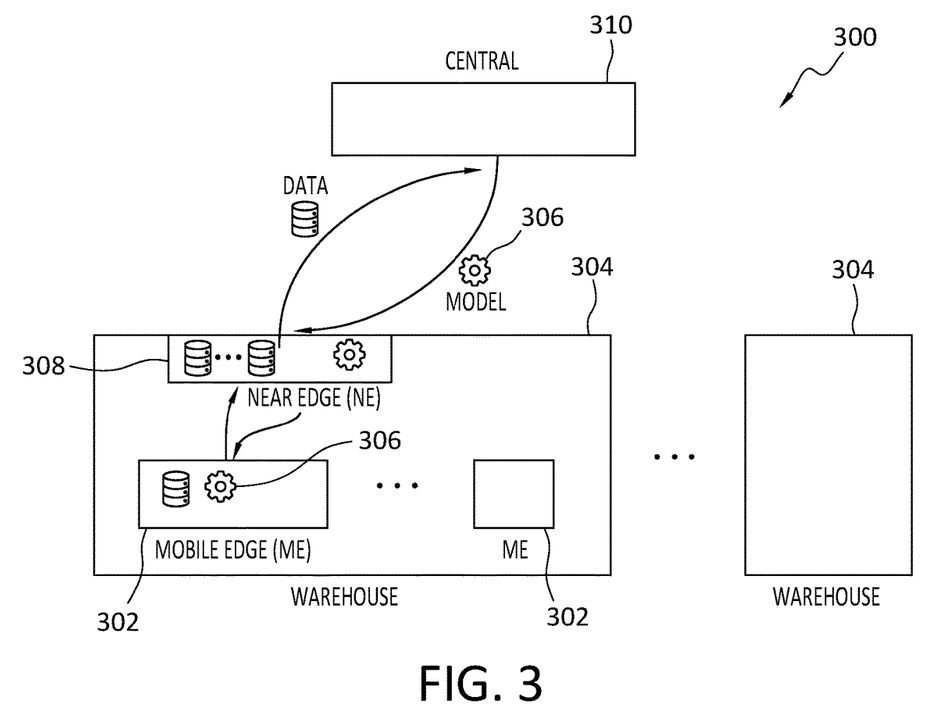
FIG. 3 discloses an overview of an example case domain for some embodiments.

As a concrete example, and with reference now to the example case domain 300 disclosed in FIG. 3, this disclosure may use, solely for the purposes of illustration and not as any limitation on the scope of the invention, the domain of mobile edge (ME) devices 302 such as forklifts moving around in a warehouse 304 to load and unload items such as pallets. Each forklift may have at least two ML models 306 on board: (1) a first model for detecting dangerous events, such as dangerous cornering events for example, from known trajectories; (2) a second model for classifying trajectories. To detect such dangerous events, the model may require the classification of one or more trajectories into a known class in a group of known classes. If a trajectory class is determined, such as by one of the models, to be unknown, that fact may be flagged so that the model does not produce a false alarm.

In general, an ME device 302 may run one or more models 306 locally and then provide data, and information about the operation of the one or more models 306, to a near edge node 308 which may, in turn, convey data and model 306 operation information to a central node 310. Based on the information and data received, the central node 310 may update the model(s) 306 and transmit the updated model(s) 306 back to the ME device(s) 302, such as by way of the near edge node 308. The ME device(s) 302 may then run the updated model(s) 206. Further details concerning the example configuration of FIG. 3 are disclosed elsewhere herein.

Two ML and algorithmic models 306 that may be employed by one or more ME devices 302 may comprise (1) a model for detecting dangerous events, and (2) another model for classifying typical trajectories, examples of which are disclosed in the 'Related Applications' referred to herein. Combined together, the example models disclosed in those documents may be deployed to mobile edge devices to detect dangerous events. Example embodiments of the present invention may comprise a combination of combine both models, namely, a trajectory classifier, and an event predictor. This combination may enable classification of a trajectory at hand, or on-the-fly as the associated mobile edge device is operation, so as to improve model performance, particularly as that performance concerns open data sets of trajectories.

That is, it cannot necessarily be expected the set of typical trajectories associated with an edge mobile device operating environment, such as a warehouse, will remain constant. That is, in new environments or contexts, a mobile edge device might produce an unknown trajectory that can lead to bad model performance. In this case the classifier may output the wrong class to the event predictor, leading not only to poor performance, but to a more opaque performance since the model does not know that it does not know. That is, the model may misclassify an unknown trajectory without knowing that there was a misclassification.

It is in circumstances such as these where an open set approach may prove beneficial. That is, an open set approach, example embodiments of which are disclosed herein, may enable the construction of classifiers, one example of which is a trajectory classifier, that are robust and aware of, that is, open to handling, unknown classes in a mobile edge device operating environment. An example of an open set classifier that may be employed in some embodiments is the C2AE, discussed earlier herein, which is an auto-classifier with open set capabilities. Note however that embodiments of the invention are not limited to use of this this particular open set classifier and, more generally, any other open set classifier existing now, or yet to be developed, with the open set classifier functionalities such as those disclosed herein may alternatively be used.

Figure 4:
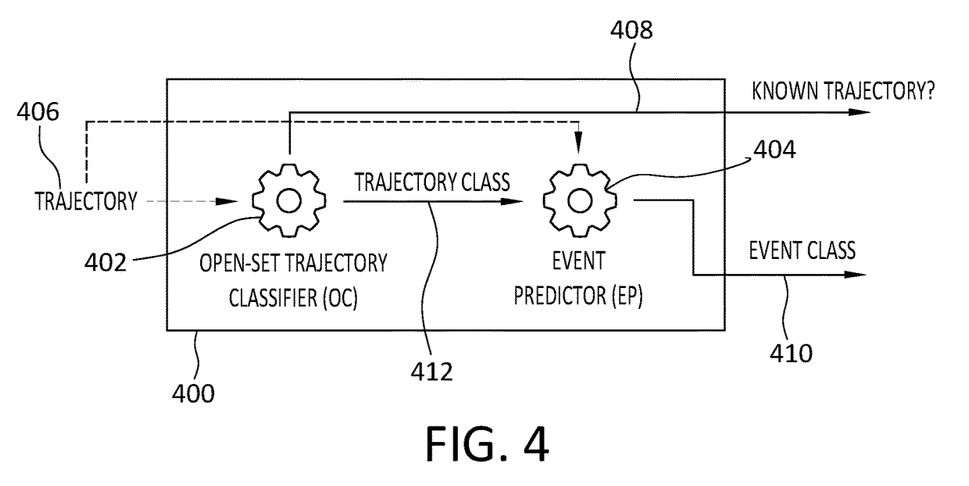
FIG. 4 discloses an example model for receiving a trajectory and passing it through to an open set classifier and to an event detection model.

Example embodiments may adapt an open set approach to the domain of event prediction through trajectory classification. Embodiments may comprise and employ models, such as those disclosed in the Related Applications, that may be operable to learn and predict events based on input trajectories. Embodiments may extend this model to also receive the trajectory class as input. Attention is directed now to FIG. 4, which discloses a schematic of such a combination of an OC (open set trajectory classifier) model 402 and an EP (event predictor) 404 into a single model 400 that receives a trajectory 406 as input, and that may generate two outputs, namely, (1) the probability 408 of class being known and (2) the event class 410 predicted for the trajectory 406. Particularly, FIG. 4 discloses a model 400 for receiving a trajectory 406 and passing the trajectory 406 through to an open set classifier, which generates a trajectory class 412 output and to an event detection model, that is the EP 404.

With the framework of FIG. 4 in view, some example embodiments may implement two primary aspects, specifically, training, and deployment. Training itself may be divided into (a) training the event predictor 404 and (b) training the open-set classifier 402. Deployment may involve keeping track of error metrics on various items such as, for example, possible drift occurring in the model 400 due to a high number of unknown predictions. A framework according to some example embodiments is addressed in more detail below.

In general, and with reference again to the example case domain 300 disclosed in FIG. 3, training may occur at a near edge environment, or 308, or at the central node 310. This decision may be made by any specialist in the domain that will decide whether there is enough variation inter-near edges 308 to justify specialized models 306 per near edge 308. If that is the case, then each near edge 308 may train its own model 306. If not, then data gathered by the near edge nodes may be communicated to the central node 310 to create a single dataset and perform training. The decision could also be made in terms of available resources at the near edge, that is, if there are not enough resources at the near edge 308, embodiments may assume the data from all near edge nodes 308 can be sent to the central node 310 in order to compose the dataset and perform training. The discussion below details trainings and deployment assuming either of these versions, but the scope of the invention is not limited to these example implementations.

C.1 Event Predictor Training

With attention first to the EP, an EP component employed in some embodiments may have already been trained from a previous deployment. If the EP is already trained, then we need to add one more input dimension to it to receive the trajectory class and re-train it on its original data or a suitable available dataset. An EP is an example implementation of an autoencoder that may take, as an input, trajectory features. Example embodiments may embrace an extended EP that takes an additional input of the predicted trajectory class, as discussed in connection with FIG. 4. This approach implemented by some example embodiments may thus take advantage of the use of a trajectory class prediction in order to improve performance of an EP. For example, FIG. 5 discloses an example extended event predictor (EP) autoencoder 500 that may take as inputs (1) various trajectory features 502, as discussed in the example of FIG. 1, and also (2) the trajectory class information 504. The nature of the output 506, that is, one or more trajectory features, of the EP 500 may remain the same as in the case where trajectory class is not provided as an input to an EP.

Figure 5:
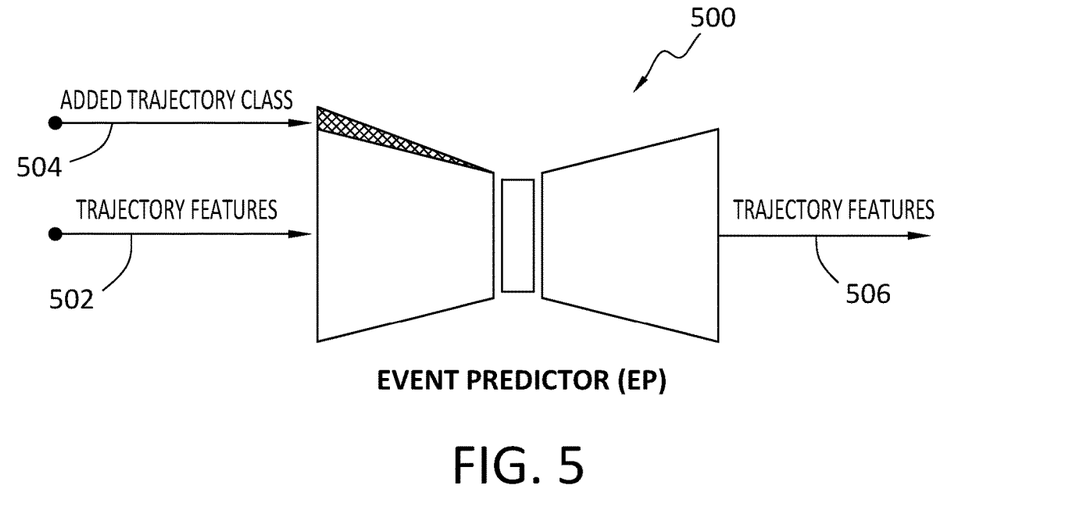
FIG. 5 discloses an extended event predictor (EP) auto-encoder, where the trajectory class is added as an input feature.

The training of the EP 500 may be implemented, for example, at a near edge (see reference 308) if the computation resources are adequate. Alternatively, the EP 500 may be trained at a central node (see reference 310). In general, the training site should have enough computational capabilities to train a small deep neural network model, which should not be an impediment to any reasonably sized, or even small, infrastructure for central-edge computing. If the training occurs at a central node, then each near edge may gather data and sends the data back to a central node where a suitable central dataset may be constructed in order to train the EP 500.

C.2 Open-Set Trajectory Classifier Training

Figure 6:
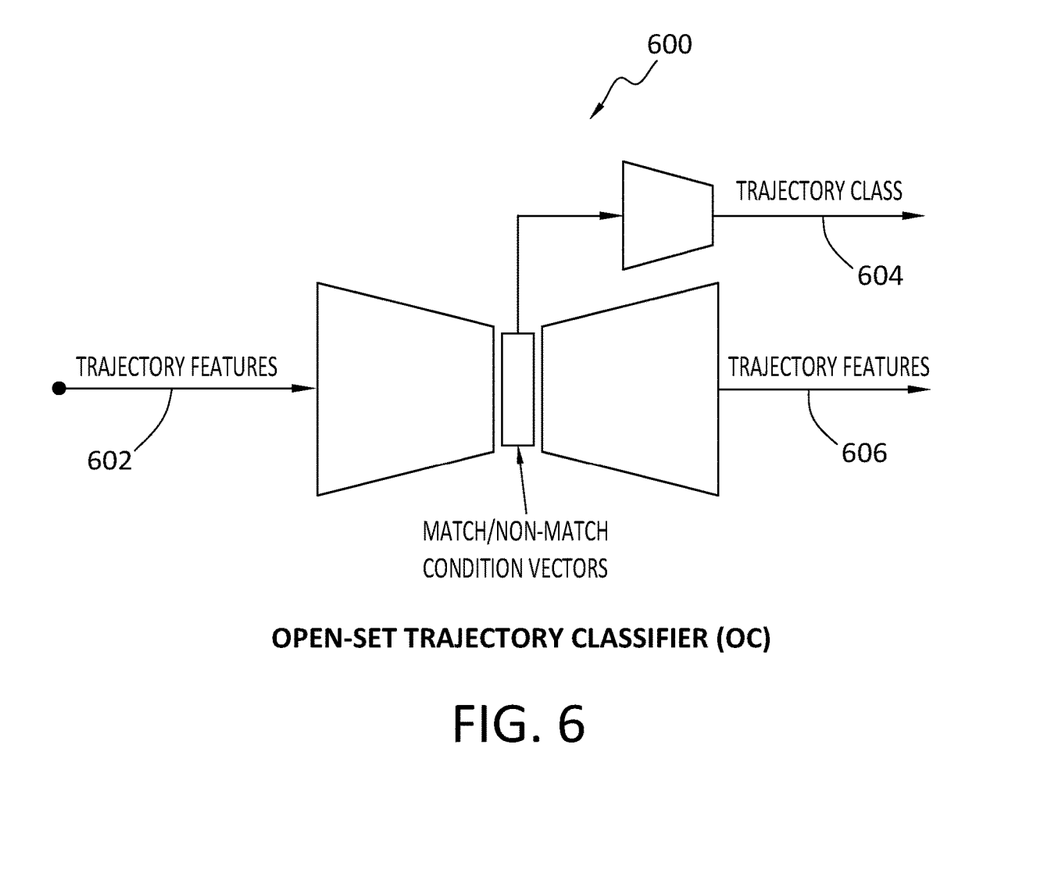
FIG. 6 discloses an open-set trajectory classifier (OC), and an instance of C2AE.

FIG. 6 discloses an example embodiment of an open-set trajectory classifier (OC) 600. The inputs to this example model 600 are the trajectory features 602, and the model 600 may process the trajectory features 602 to generate two outputs, namely, a predicted trajectory class 604, and the decoded trajectory features 606. One example implementation of the model 600 may be a C2AE, as disclosed herein. Example embodiments may adapt the C2AE training to the mobile edge domain and present the training in two stages, particularly, closed-set training, and open-set training. The following discussion addresses these training types.

C.2.1 Closed Set Training

In some embodiments, the first step to training an OC (open set classifier) model is to perform closed-set training. This means jointly training the encoder part together with the classifier (see FIG. 4). To this end, embodiments may access to labeled dataset that maps trajectory and their features to trajectory classes. It is not necessarily expected that the domain will provide such labels explicitly. However, embodiments may employ techniques, such as those disclosed in the 'Related Applications' that use rule-based and algorithmic processes to assign a trajectory class given trajectory features as input, which may be based on shared similarity or other available information. These labels and trajectory features may serve as pre-training for the OC.

Figure 7:
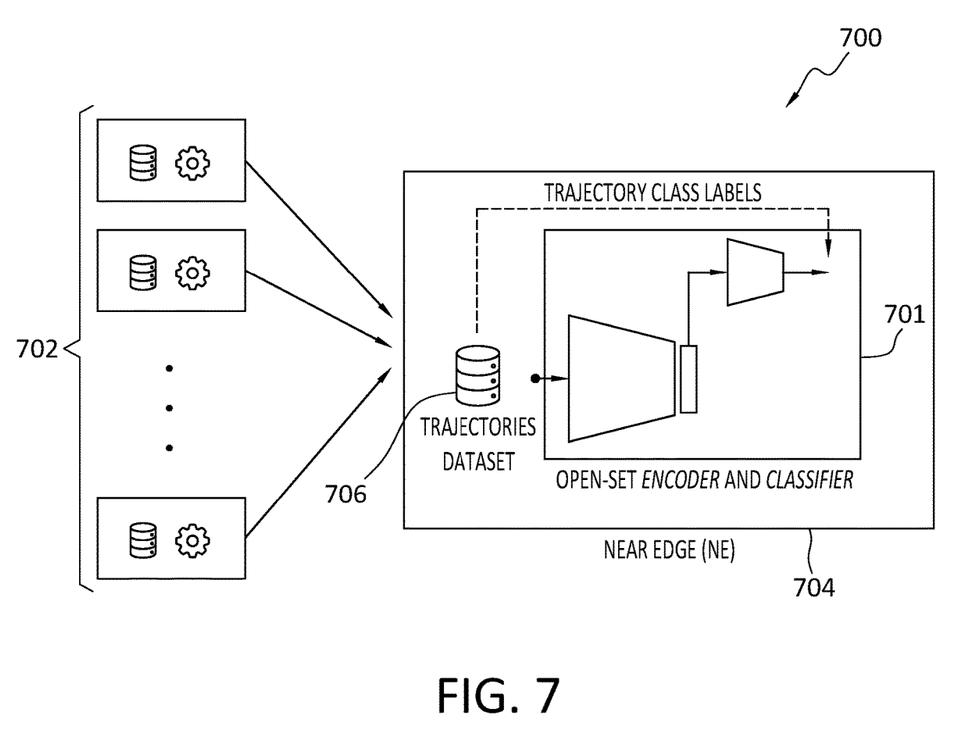
FIG. 7 discloses a closed set training of an encoder and classifier.

As shown in the configuration 700 of FIG. 7, which discloses an example of closed set training of an encoder and classifier 701, each mobile edge 702 may collect trajectory data about the operation of mobile edge device, such as a forklift for example, and periodically communicates the data to a near edge node 704. The near edge node 704 may contain the software operable to assign classes to these trajectories collected from each edge node 702. Embodiments may then then build a single dataset 706 containing many varied trajectories and their respective classes. Embodiments may use the dataset 706 to pre-train the encode and classifier elements of the OC model 701.

C.2.2 Open Set Training

The second part of an example of training procedure for an open-set OC model is to perform open-set training, which may be split into two stages, namely, conditional decoder training, and EVT modeling.

During conditional decoder training, embodiments may train the OC to perform a good reconstruction of the trajectories when doing so for the correct class, and also to train the OCT to perform a bad reconstruction when conditioned on other trajectory classes, where all the other trajectory classes may be considered as not being the correct one. Embodiments may be able to perform such training using only the dataset, such as the dataset 706 for example, that was gathered in the previous closed-set training part.

Conditional decoder training may be performed with a strategy similar to one of those disclosed in the 'Related Applications,' and in some embodiments of the invention, such a strategy may be extended to account for the fact that there may be class imbalance across trajectory classes. More specifically, a loss component (see 'Related Applications,' equation 5) related to the condition vector matching may be modified to be:

$$L_r^{nm}(\{\Theta_g, \Theta_\gamma, \Theta_\beta\}) = \frac{1}{N}\sum_{i=1}^{N}\alpha_c\|X_i^m - \tilde{X}_i^{nm}\|$$

where αc(i) corresponds to the weight of the identity class for the current input c(i). More concretely, this equation considers a weight per class inversely proportional to the number of data points for that class, which can be easily computed from the dataset that was gathered in the closed-set training step. The other training stages of EVT modeling and threshold calculations may be performed as disclosed in the 'Related Applications.'

As noted above, a class imbalance across trajectory classes may occur in some instances. For example, a trajectory class for dangerous events may include only a small amount of data, or a small number of such events. On the other hand, a trajectory class for normative, or not dangerous, events may include a relatively large amount of data, or a larger number of such events. Thus, in this example, the distribution of data across these two trajectory classes is unbalanced.

C.3 Deployment

After completing the closed-set and open-set training stages, an open set model (OC) may thus be obtained that may be combined with an event predictor (EP) to generate a complete model, such as the model 400 in FIG. 4 for example. This model may then be deployed from the node where it was trained, which may be a near edge node or a central node for example, to each mobile edge node. Once the model is deployed, each edge node may start using the model as its main event predictor model. Depending on the particular application, the deployed model may be configured to predict at every trajectory made by the mobile edge, or only at specific trajectories, or even at specific time intervals. Whatever may be the particular application, the model may perform inferencing through open-set k-inference (see 'Related Applications'). That is, the model may will condition its prediction against all known classes and pick the best option from amongst those known classes.

Each mobile edge device to which the model has been deployed may keep a record table of trajectories and the model inference output, and communicate this table periodically to its respective near edge node. The information in these tables may enable tracking of the performance of the model. Each near edge node, in turn, may communicate the tables to the central node, possibly in the event that the near edge lacks adequate resources to assess model performance, or if the near edge has adequate resources to assess model performance, the assessment may be done at the near edge. At pre-specified time intervals, embodiments may examine the joined tables and compute the level of "open-setness" as a proportion of unknown classes predicted, to the known predicted classes. If the proportion is above a pre-specified threshold, such as 5% for example, embodiments may spawn a new training procedure to gather more training data and re-train the OC model.

D. Further Discussion

As will be apparent from this disclosure, example embodiments, which may deal with an open set scenario in trajectory classification for mobile edge devices, may provide various useful features and advantages. For example, an embodiment may apply an open-set model to the mobile edge domain of event prediction from trajectories. In particular, example embodiments may comprise a method to effectively perform a difficult task, by combining, adapting and extending a solution to the sub-problem of event detection from unsupervised data to an approach of open set classification in the example context of trajectory data.

As another example, one or more embodiments may operate to assess class imbalance, such as may occur in the skewed domain of trajectories. Particularly, embodiments may extend an open set training formulation to account for parametrized class weights. The approach may be generic, in that it may be adapted for all domains, and may be implemented as a specialized loss function.

In a final example, embodiments may implement the orchestration of the model training and a smart deployment phase. Particularly, embodiments may implement a smart deploy phase which may determine that new training of the model may be triggered by keeping track of model performance.

E. Example Methods

Figure 8:
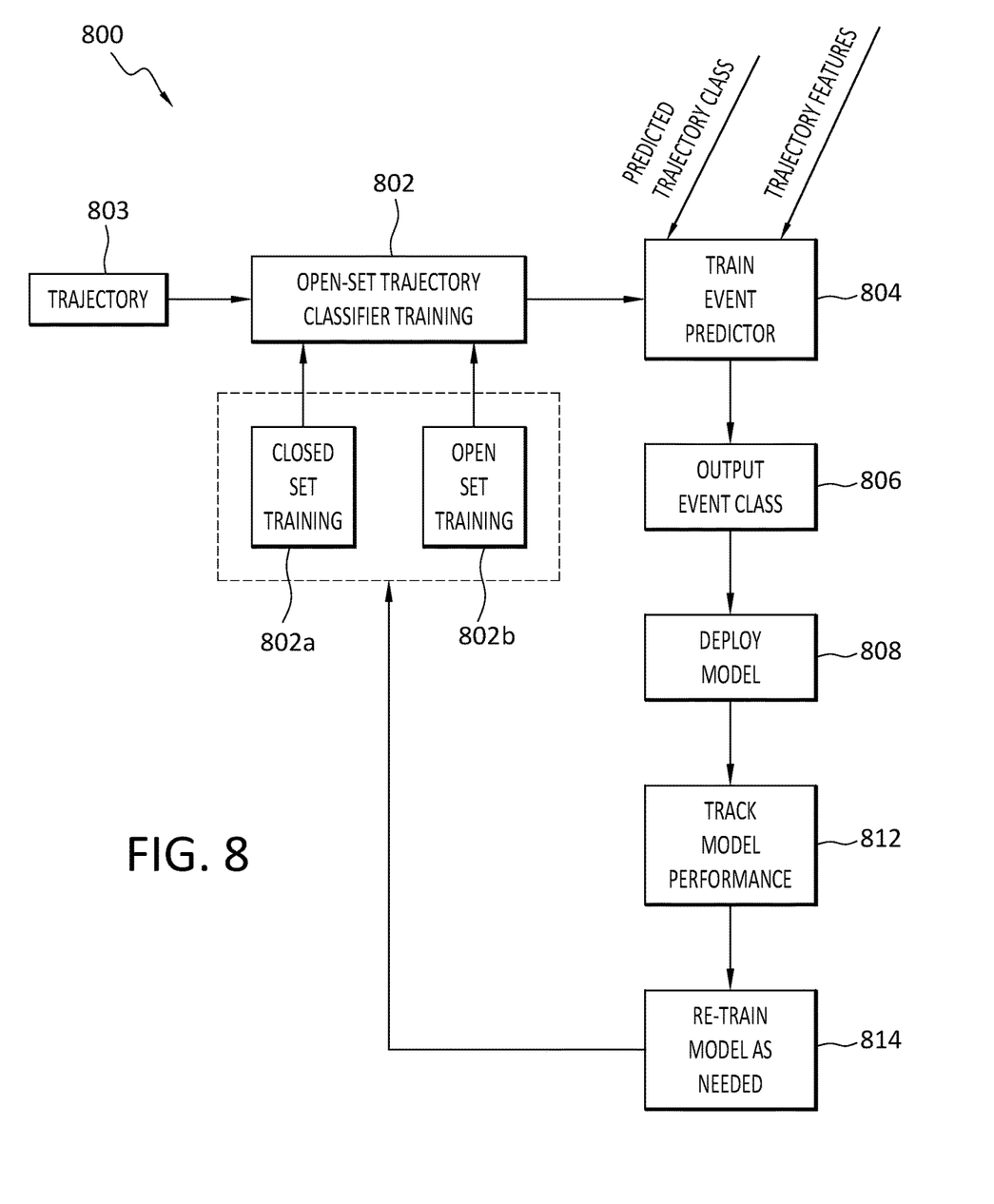
FIG. 8 discloses an example method according to some embodiments.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 according to some embodiments is disclosed. In some embodiments, the method 800 may be performed at a mobile edge device, at a near edge site, at a central node, or by any combination of these. The scope of the invention is not limited to implementation of the method 800, or any other disclosed methods, by any particular entity or group of entities.

The example method 800 may begin by training 802 an open-set trajectory classifier. The open-set trajectory classifier may be an element of a model that runs at a mobile edge device. The training 802 of the open-set trajectory classifier may comprise two phases, namely, a closed set training phase 802a and an open set training phase 802b. Input 803 used for one or both of these training phases may comprise a trajectory received by the open-set trajectory classifier.

Output, such as one or more trajectory classes which may or may not comprise a predicted trajectory class, generated by the trained open-set trajectory classifier may be input to an event predictor. The event predictor may also receive one or more trajectory features as input. The event predictor may then be trained 804 using the trajectory class and the trajectory features. The output 806 of the event predictor may be an event class (see FIG. 4), which may define an event, predicted for the trajectory 803.

After the training of the open-set trajectory classifier 802, and the training of the event predictor 804, have been completed, the model that includes the open-set trajectory classifier and the event predictor may then be deployed 808 to one or more mobile edge devices. Each of the mobile edge devices 810 may track 812, such as by keeping record table of trajectories and corresponding inferences, the performance of the model instantiation respectively located at those mobile edge devices. The table information may be periodically communicated to a near edge node and/or to a central node. Further, the table information may be periodically analyzed to compute, for example, a proportion of unknown classed predicted::the number of known predicted classes. The model may then be retrained 814 as/if needed based on the outcome of the analysis of the table information.

F. Further Example Embodiments

Following are some further example embodiments of the invention. These are presented only by way of example and are not intended to limit the scope of the invention in any way.

Embodiment 1. A method, comprising: training an event predictor, of a machine learning model, wherein the training comprises: providing, to the event predictor, a predicted trajectory classification that is unknown to the event predictor component; and providing, to the event predictor, a trajectory feature that is associated with the predicted trajectory classification, wherein after the event predictor is trained with the predicted trajectory classification and the trajectory feature, the event predictor is operable to receive an unknown trajectory class and predict an event class for the unknown trajectory class, or predict that it is in fact an unknown trajectory class; and; and training an open set trajectory classifier, of the machine learning model, wherein the training of the open set trajectory classifier comprises: performing a closed set training process using a labeled dataset that maps a trajectory and its trajectory features to a trajectory class; and performing an open set training process using the labeled dataset, wherein after the open set trajectory classifier is trained, the open set trajectory classifier is operable to receive an unknown trajectory and classify the unknown trajectory with the predicted trajectory classification.

Embodiment 2. The method as recited in embodiment 1, wherein the predicted trajectory classification is provided by the open set trajectory classifier to the event predictor.

Embodiment 3. The method as recited in any of embodiments 1-2, wherein the unknown trajectory comprises information about a movement and/or position of a mobile edge device, in which the machine learning model is deployed, in a physical operating domain.

Embodiment 4. The method as recited in any of embodiments 1-3, wherein the open set training process for the open set trajectory classifier accounts for a class imbalance across trajectory classes that are known to the open set trajectory classifier.

Embodiment 5. The method as recited in any of embodiments 1-4, wherein the machine learning model is operable to detect abnormal events occurring during operation of a mobile edge device in which the machine learning model is deployed.

Embodiment 6. The method as recited in any of embodiments 1-5, wherein the event predictor comprises an auto-encoder that receives, as inputs, the predicted trajectory classification and the trajectory feature.

Embodiment 7. The method as recited in any of embodiments 1-6, wherein the open set trajectory classifier comprises an auto-encoder that receives, as input, trajectory features of the unknown trajectory.

Embodiment 8. The method as recited in any of embodiments 1-7, wherein performing an open set training process using the labeled dataset comprises performing a first reconstruction of the trajectories in the labeled dataset for those trajectories in the labeled dataset that are in a correct class, and performing a second reconstruction of the trajectories in the labeled dataset for those trajectories in the labeled dataset that are in an incorrect class.

Embodiment 9. The method as recited in any of embodiments 1-8, wherein training of the machine learning model is automatically triggered as a result of a monitoring process that tracks performance of the machine learning model.

Embodiment 10. The method as recited in any of embodiments 1-9, further comprising deploying the machine learning model, after the machine learning model is trained, to a group of mobile edge devices.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
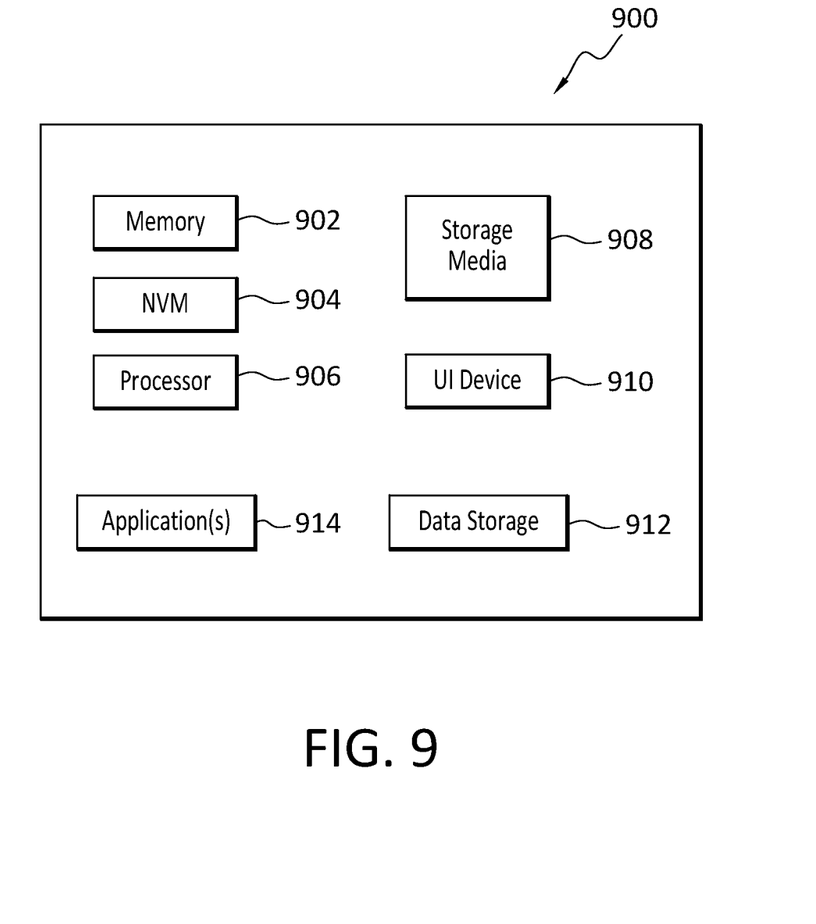
FIG. 9 discloses a computing entity operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI (user interface) device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    training an event predictor, of a machine learning model, wherein the training comprises:
        providing, to the event predictor, a predicted trajectory classification that is unknown to the event predictor component; and
        providing, to the event predictor, a trajectory feature that is associated with the predicted trajectory classification,
        wherein after the event predictor is trained with the predicted trajectory classification and the trajectory feature, the event predictor is operable to receive an unknown trajectory class and predict an event class for the unknown trajectory class, or predict that it is in fact an unknown trajectory class; and
    training an open set trajectory classifier, of the machine learning model, wherein the training of the open set trajectory classifier comprises:
        performing a closed set training process using a labeled dataset that maps a trajectory and its trajectory features to a trajectory class; and
        performing an open set training process using the labeled dataset, and performing the open set training process using the labeled dataset comprises performing a first reconstruction of the trajectories in the labeled dataset for those trajectories in the labeled dataset that are in a correct class, and performing a second reconstruction of the trajectories in the labeled dataset for those trajectories in the labeled dataset that are in an incorrect class, wherein after the open set trajectory classifier is trained, the open set trajectory classifier is operable to receive an unknown trajectory and classify the unknown trajectory with the predicted trajectory classification.

2. The method as recited in claim 1, wherein the predicted trajectory classification is provided by the open set trajectory classifier to the event predictor.

3. The method as recited in claim 1, wherein the unknown trajectory comprises information about a movement and/or position of a mobile edge device, in which the machine learning model is deployed, in a physical operating domain.

4. The method as recited in claim 1, wherein the open set training process for the open set trajectory classifier accounts for a class imbalance across trajectory classes that are known to the open set trajectory classifier.

5. The method as recited in claim 1, wherein the machine learning model is operable to detect abnormal events occurring during operation of a mobile edge device in which the machine learning model is deployed.

6. The method as recited in claim 1, wherein the event predictor comprises an auto-encoder that receives, as inputs, the predicted trajectory classification and the trajectory feature.

7. The method as recited in claim 1, wherein the open set trajectory classifier comprises an auto-encoder that receives, as input, trajectory features of the unknown trajectory.

8. The method as recited in claim 1, wherein training of the machine learning model is automatically triggered as a result of a monitoring process that tracks performance of the machine learning model.

9. The method as recited in claim 1, further comprising deploying the machine learning model, after the machine learning model is trained, to a group of mobile edge devices.

10. A non-transitory storage medium having stored therein instructions that are executable by one or more hardware processors to perform operations comprising:

training an event predictor, of a machine learning model, wherein the training comprises:
providing, to the event predictor, a predicted trajectory classification that is unknown to the event predictor component; and
providing, to the event predictor, a trajectory feature that is associated with the predicted trajectory classification,
wherein after the event predictor is trained with the predicted trajectory classification and the trajectory feature, the event predictor is operable to receive an unknown trajectory class and predict an event class for the unknown trajectory class, or predict that it is in fact an unknown trajectory class; and training an open set trajectory classifier, of the machine learning model, wherein the training of the open set trajectory classifier comprises:

performing a closed set training process using a labeled dataset that maps a trajectory and its trajectory features to a trajectory class; and performing an open set training process using the labeled dataset, and performing the open set training process using the labeled dataset comprises performing a first reconstruction of the trajectories in the labeled dataset for those trajectories in the labeled dataset that are in a correct class, and performing a second reconstruction of the trajectories in the labeled dataset for those trajectories in the labeled dataset that are in an incorrect class, wherein after the open set trajectory classifier is trained, the open set trajectory classifier is operable to receive an unknown trajectory and classify the unknown trajectory with the predicted trajectory classification.

11. The non-transitory storage medium as recited in claim 10, wherein the predicted trajectory classification is provided by the open set trajectory classifier to the event predictor.

12. The non-transitory storage medium as recited in claim 10, wherein the unknown trajectory comprises information about a movement and/or position of a mobile edge device, in which the machine learning model is deployed, in a physical operating domain.

13. The non-transitory storage medium as recited in claim 10, wherein the open set training process for the open set trajectory classifier accounts for a class imbalance across trajectory classes that are known to the open set trajectory classifier.

14. The non-transitory storage medium as recited in claim 10, wherein the machine learning model is operable to detect abnormal events occurring during operation of a mobile edge device in which the machine learning model is deployed.

15. The non-transitory storage medium as recited in claim 10, wherein the event predictor comprises an auto-encoder that receives, as inputs, the predicted trajectory classification and the trajectory feature.

16. The non-transitory storage medium as recited in claim 10, wherein the open set trajectory classifier comprises an auto-encoder that receives, as input, trajectory features of the unknown trajectory.

17. The non-transitory storage medium as recited in claim 10, wherein training of the machine learning model is automatically triggered as a result of a monitoring process that tracks performance of the machine learning model.

18. The non-transitory storage medium as recited in claim 10, wherein the operations further comprise deploying the machine learning model, after the machine learning model is trained, to a group of mobile edge devices.

* * * * *